United States Patent [19]

Hansen

[11] 4,132,450
[45] Jan. 2, 1979

[54] SILO UNLOADER LIFT ATTACHMENT

[75] Inventor: Glen D. Hansen, Maple Plain, Minn.

[73] Assignee: Veda, Inc., Long Lake, Minn.

[21] Appl. No.: 765,398

[22] Filed: Feb. 3, 1977

[51] Int. Cl.² .............................................. B65G 65/36
[52] U.S. Cl. ................................. 302/56; 214/17 DB;
294/81 R
[58] Field of Search .................... 214/17 DB; 302/56;
294/67 AA, 81 R

[56] References Cited
U.S. PATENT DOCUMENTS

| 3,085,553 | 4/1963 | Anderson | 294/81 R X |
| 3,512,661 | 5/1970 | Slieter | 214/17 DB |
| 3,912,090 | 10/1975 | Pondell | 214/17 DB |

Primary Examiner—Robert G. Sheridan
Attorney, Agent, or Firm—Burd, Braddock & Bartz

[57] ABSTRACT

A top unloading silo unloader equipped with a lift attachment connected to a lifting cable used to raise and lower the silo unloader in a tower silo. The lift attachment has an elongated body releasably connected at one end to the impeller housing of the unloader. A pair of downwardly and outwardly directed legs are secured to the opposite end of the body. The lower ends of the legs are attached to the frame members of the collector of the silo unloader. A sleeve slidably mounted on the body is connected to the lifting cable. Releasable lock members on the sleeve operate to fix the position of the sleeve on the body to control the angular position of the unloader carried by the lifting cable.

29 Claims, 10 Drawing Figures

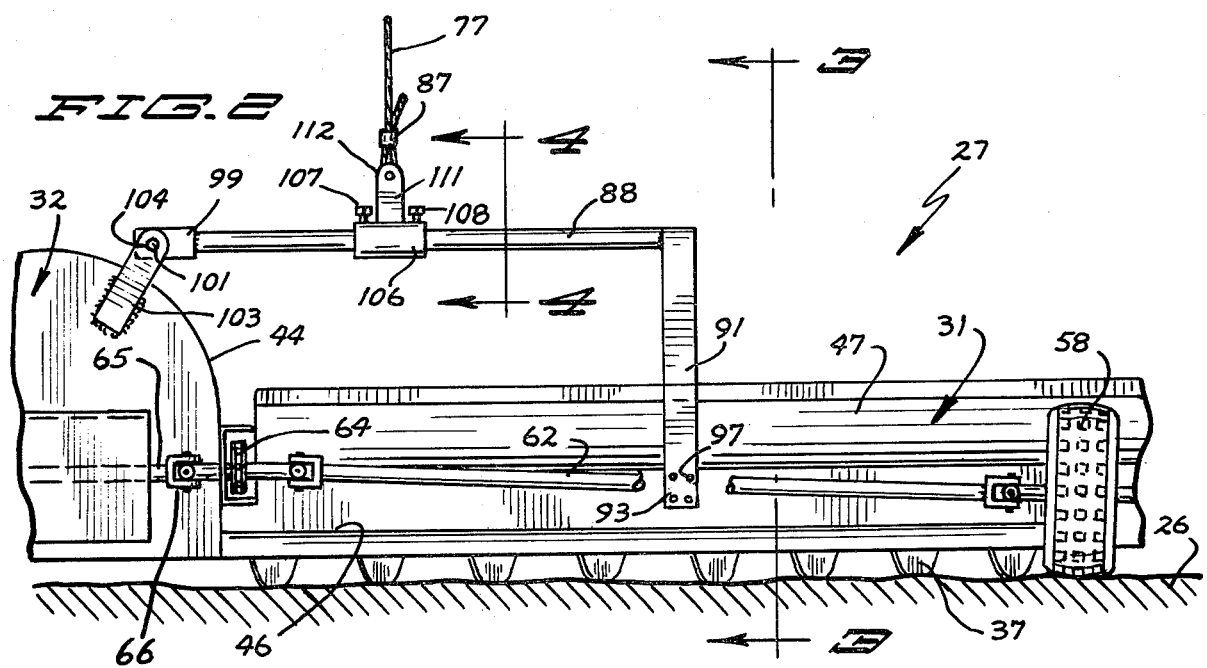
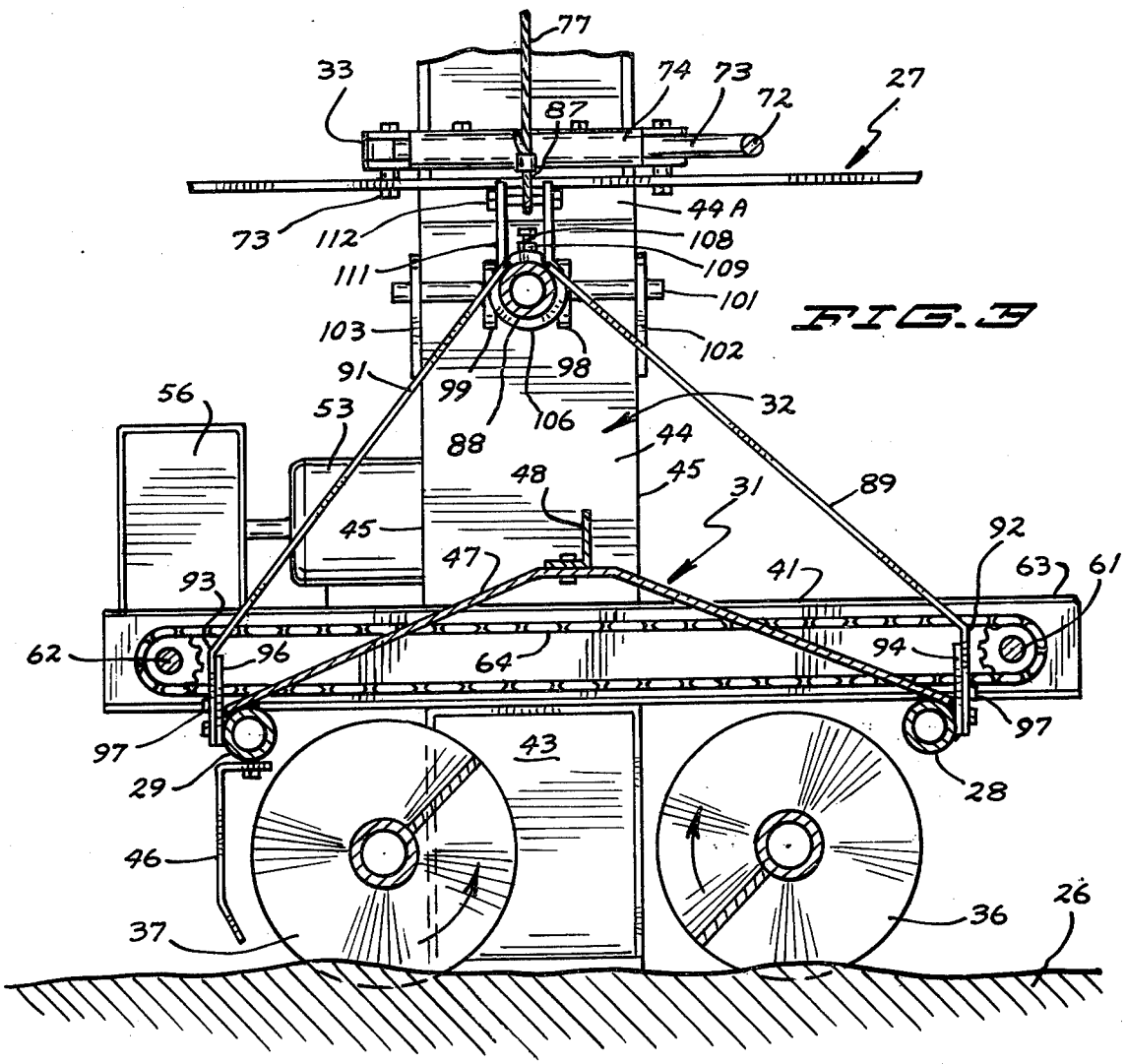

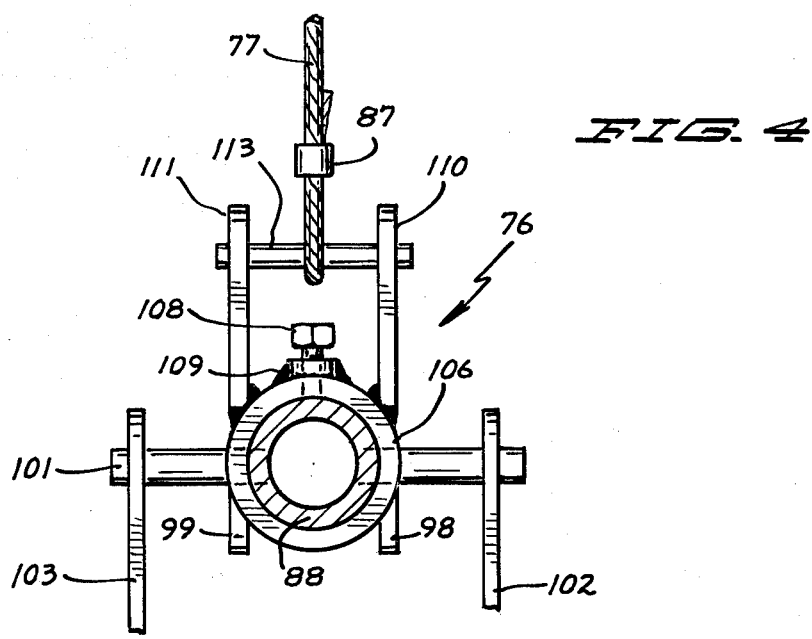
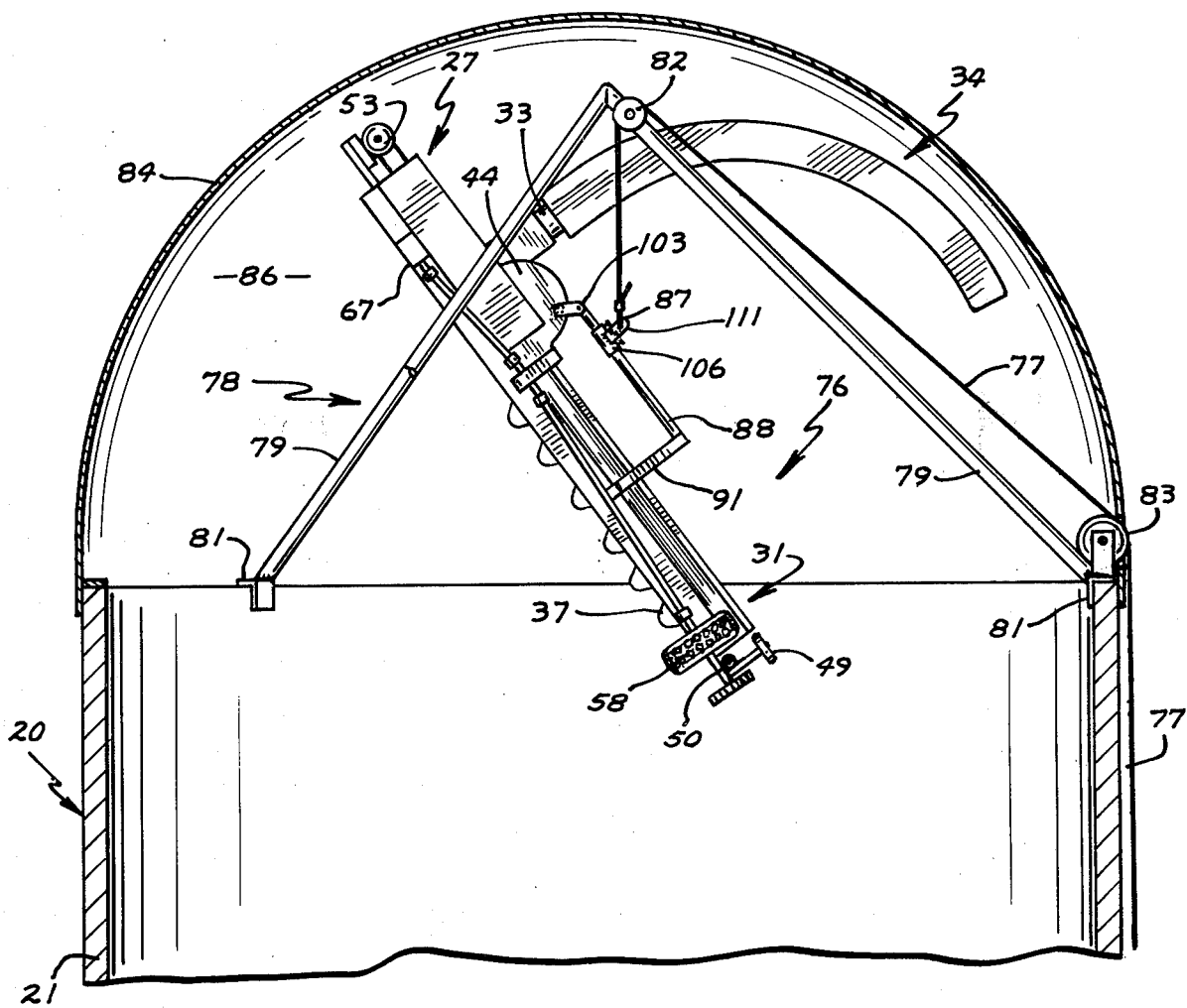

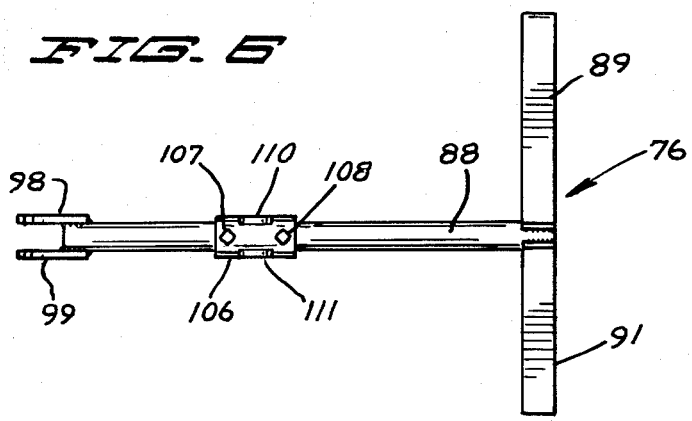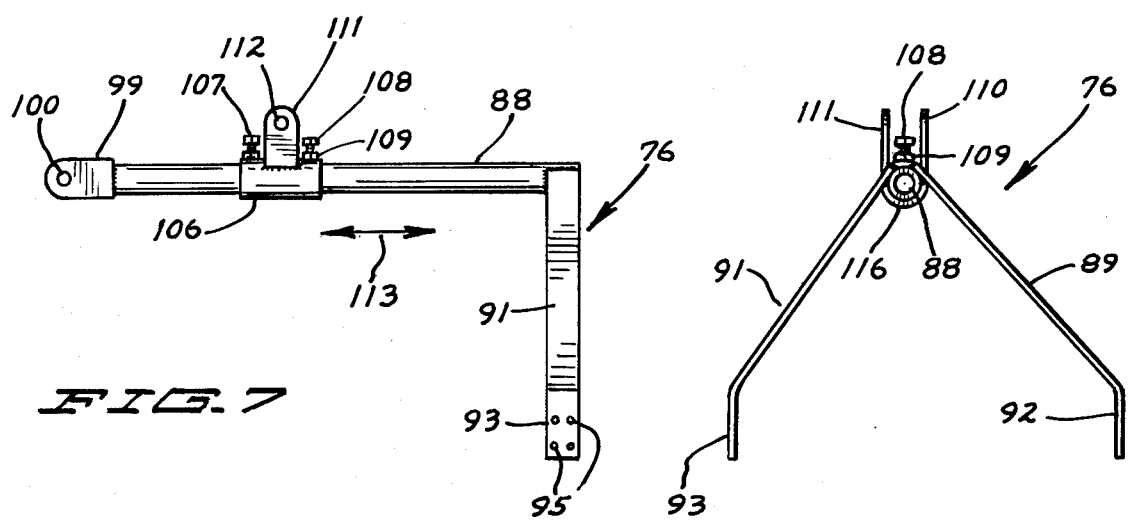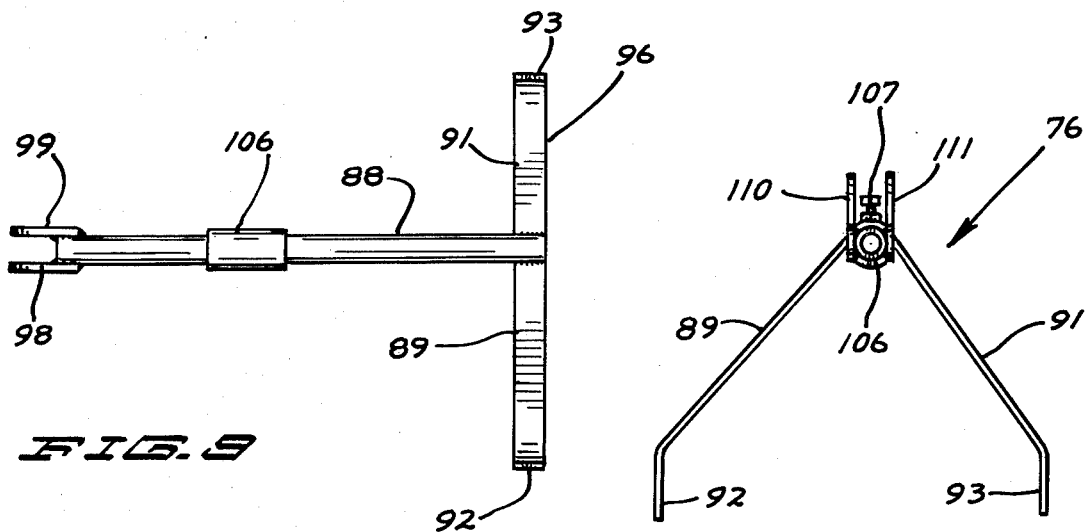

SILO UNLOADER LIFT ATTACHMENT

BACKGROUND OF INVENTION

Top unloading silo unloaders are elevated to the top of tower silos so they do not interfere with the filling of the silos. Tripod structures are mounted on the top of the silo wall to provide support structures for cables connected to winches used to raise and hold the silo unloaders adjacent the roof of the silos. The silo unloader impeller housings have been provided with structures adapted to be connected to the lifting cables. These structures do not provide for an adjustment of the connecting position of the cable relative to the unloader. The unloaders are not balanced with the result that the unloaders will move to a generally perpendicular position when raised to the top of the silo. When the unloaders are in this position, they utilize considerable space at the top of the silo, thereby interfering with the filling of the silo and preventing the top of the silo from being filled with material.

SUMMARY OF THE INVENTION

The invention is directed to structure adapted to be attached to an object to connect the object to a lifting cable. More particularly, the invention is directed to a lift attachment adapted to be attached to a top unloading silo unloader to connect the silo unloader to a lifting cable attached to a winch. The lift attachment has an elongated body. First means connected to a first end of the body is attached to an impeller housing of the silo unloader. A second means connected to the second end of the body is secured to the collector of the unloader. A third means on the body contains structure adapted to be connected to the lifting cable. The third means is slidably adjustable on the body so that the longitudinal lifting point of the cable can be altered, thereby allowing the angular position of the unloader to be changed.

In a specific embodiment of the attachment, the elongated body is a generally horizontal cylindrical member. The first means are a pair of members secured to one end of the cylindrical member and pivotally connected to the housing with a transverse pin. The second means comprise a pair of downwardly and outwardly directed legs secured to the second or outer end of the cylindrical member. The lower ends of the legs are attached to the frame members of the collector of the silo unloader. The third means is a sleeve slidably mounted on the cylindrical member. The lock means includes at least one bolt threadably mounted on the sleeve and engageable with the cylindrical member to lock the cylindrical member in a selected location along the length of the cylindrical member. A pair of upright members are secured to the cylindrical member and accommodate a transverse pin used to connect to the lifting cable.

An object of the invention is to provide a lift attachment for a top unloading silo unloader usable with a lifting cable to raise the silo unloader up to the roof of the silo. A further object of the invention is to provide a silo unloader with a lift attachment having an adjustable member which permits the silo unloader to be horizontally balanced or inclined so that the silo unloader can be raised into close proximity with the roof of the silo. Yet a further object of the invention is to provide a lift attachment usable with different types of top unloading silo unloaders and a lifting cable to elevate an unloader to a position adjacent the inside of the roof of a tower silo and hold the unloader in a selected angular or horizontal position. A further object of the invention is to provide a relatively simple, economical, and sturdy lift attachment that is readily connected to a silo unloader and is used with cable and winch structure to raise the silo unloader in a tower silo.

IN THE DRAWINGS

FIG. 2 is an enlarged side elevational view taken along the line 2—2 of FIG. 1;

FIG. 3 is an enlarged sectional view taken along the line 3—3 of FIG. 2;

FIG. 4 is an enlarged sectional view taken along the line 4—4 of FIG. 2;

FIG. 5 is a vertical sectional view of the top of a tower silo showing a silo unloader equipped with a lift attachment in the raised position in the silo;

FIG. 6 is a top plan view of the lift attachment;

FIG. 7 is a side elevational view of FIG. 6;

FIG. 8 is a front elevational view of FIG. 7;

FIG. 9 is a bottom plan view of FIG. 6; and

FIG. 10 is an elevational view of the left side of FIG. 6.

DESCRIPTION OF PREFERRED EMBODIMENT

Figure 1:
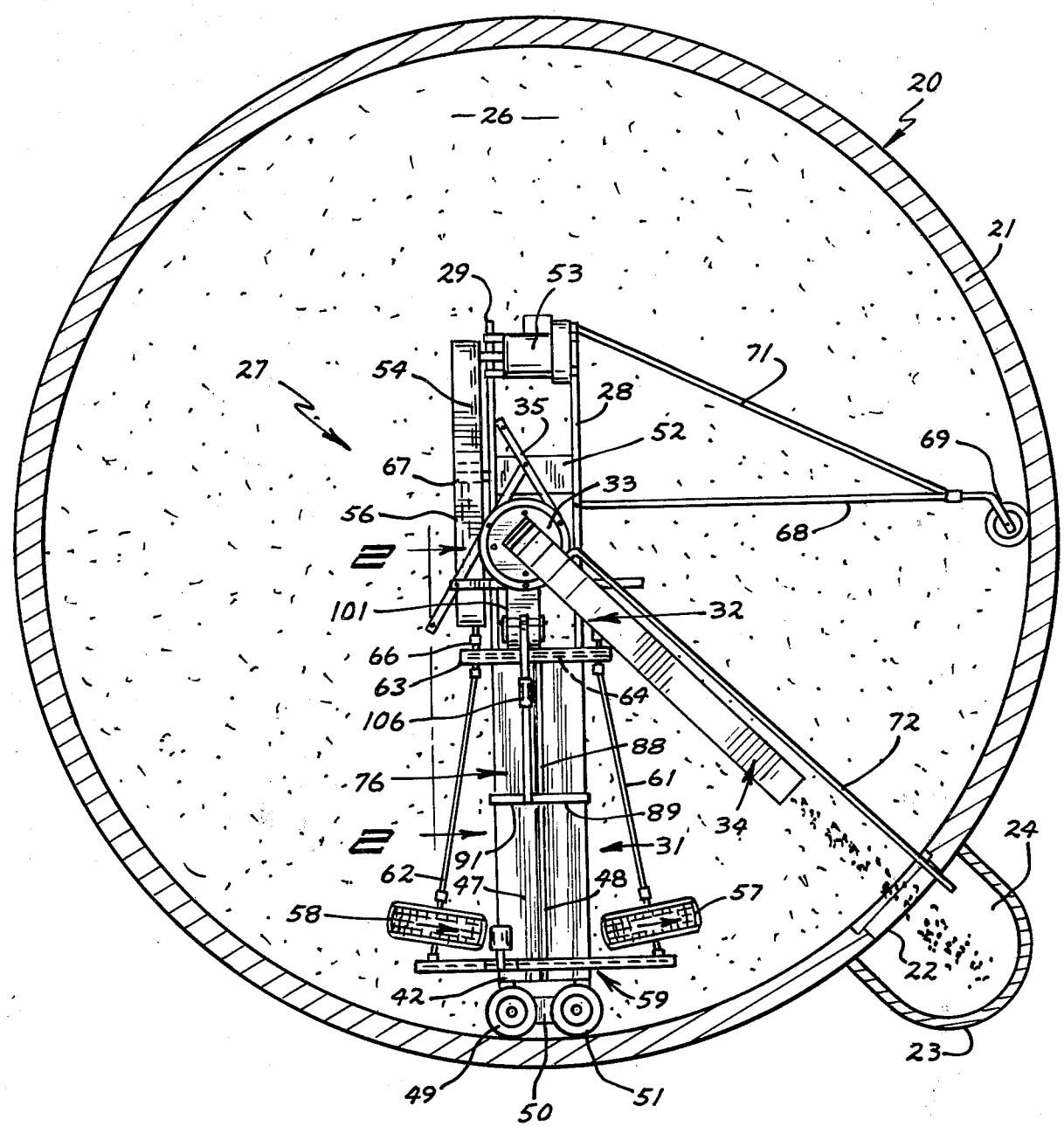
FIG. 1 is a top plan view of a top unloading silo unloader equipped with the lift attachment of the invention located in a tower silo.

Referring to FIG. 1, there is shown a tower silo indicated generally at 20 having an upright cylindrical wall 21 of concrete, cement staves and the like. Wall 21 has a plurality of vertically aligned openings or doorways 22 providing an access into an upright chute 23. Chute 23 has a generally U-shaped configuration and is attached to the outside of wall 21. Chute 23 defines an upright passage 24 for guiding material in a downward direction to the base of the silo.

Animal forage material 26, as silage, haylage, and the like, is stored in the silo. This material is removed from the silo with a machine known as a top unloading silo unloader indicated generally at 27. Unloader 27 operates to remove the top material and direct the material through an open doorway 22 into passage 24 of chute 23. Unloader 27 has a pair of longitudinal frame members 28 and 29, as elongated tubular or channel beams. Frame members 28 and 29 extend outwardly toward wall 21 to form part of the material collector indicated generally at 31.

Collector 31 operates to gather material and moves the material to an impeller indicated generally at 32. Impeller 32 moves the material through an out or discharge chute 34. Chute 34 has an outer end spaced from and facing the passageway 22 so that the material is directed by chute 34 through open doorway 22 into the passage 24. Chute 34 is mounted on a slip ring assembly 33 having a passageway in communication with the impeller 32 and out chute 34. A triangular frame structure 35 surrounds and is secured to the slip ring assembly 33. Slip ring assembly can be the transition assembly disclosed by Buschbom in U.S. Pat. Nos. 3,517,369 and 3,594,680. Frame structure 35 has three outer ends which are used to anchor the suspension cables used to pendantly support silo unloader 27 from a tripod structure mounted on top of the silo. An example of a suitable tripod is shown at 78 in FIG. 5. Other tripods are disclosed by Buschbom in U.S. Pat. Nos. 3,128,081 and 3,211,407.

Collector 31, as shown in FIG. 3, has a leading auger 36 and a trailing auger 37. Augers 36 and 37 extend in a generally radial direction and are rotated in opposite directions to feed the material to impeller 32. A cross member 41 is mounted on frames 28 and 29 immediately in front of impeller 32. As shown in FIG. 1, a cross member 42 is located at the outer end of the collector and has suitable bracket structures and bearings (not shown) for the outer end of the augers 36 and 37. Wall cleaners (not shown) are mounted on the outer ends of the augers and function to remove material from adjacent the wall. An example of the wall cleaner usable with the augers 36 and 37 is shown by Buschbom in U.S. Pat. No. 3,651,960. Other types of wall cleaners can be used with augers 36 and 37.

Impeller 32 has a bottom inlet opening 43 in the front and side of impeller housing 44. Housing 44 is a scroll configuration with generally upright side walls 45. Housing 44 has a top outlet neck 44A having an opening in communication with the opening in the slip ring assembly 33 and the inlet to out chute 34.

Returning to FIG. 3, the back of collector 31 has a downwardly directed wall or member 46. Wall 46 is located adjacent the back side of trailing auger 37 and is secured to the frame member 29. The space over the top of the augers 36 and 37 is closed with a cover 47. The center of cover 47 is attached to a horizontal radial beam 48. The outer edges of cover 47 are attached to frame members 28 and 29.

As shown in FIG. 1, a pair of wall engaging wheels 49 and 51 are rotatably mounted on a plate 50 attached to outer cross member 42. Wheels 49 and 51 ride on the inside surface of wall 21 and space the wall cleaners from the wall.

The inner ends of both augers 36 and 37 are connected to a gear box or transmission 52. Transmission 52 is mounted on frame members 28 and 29 adjacent the inside of impeller 32. An electric motor 53 operates to drive transmission 52 through a power transmission assembly 54, as a belt and pulley drive or a chain and sprocket drive. An example of a belt and pulley drive for the transmission and impeller rotor is disclosed by Buschbom in U.S. Pat. No. 3,207,332. The power transmission assembly is enclosed within a safety shield 56 located along frame member 29.

A pair of driven wheels 57 and 58 engage the top surface of the materials 26 and drive collector 31 around the silo. A leveling apparatus indicated generally at 59 connects the driven wheels 57 and 58 to the outer end of the collector 31. The leveling apparatus 59 operates in response to the changes in the horizontal position of collector 31 to insure that the top of the material 26 remains substantially level or at a selected angle. The structure and operation of the leveling apparatus is disclosed in co-pending application Ser. No. 759,417 filed Jan. 14, 1977.

Rotational power is transmitted to wheels 57 and 58 with drive shafts 61 and 62. The inner ends of the drive shafts 61 and 62 are rotatably mounted with suitable bearings on a transverse beam or frame member 63. A power transmission assembly 64, as a chain and sprocket drive, connect shafts 61 and 62. Shaft 62 is connected to a drive shaft 65 with a universal joint 66. Drive shaft 63 is operatively connected to a gear box 67. Power is supplied to gear box 67 from transmission 52 so that on operation of motor 53, augers 36 and 37 are rotated and wheels 57 and 58 are driven to move collector 31 around the silo. Motor 53 also drives a rotor or rotatable member enclosed within the housing 44 of the impeller. The rotatable member has a plurality of hinged V-throwers operative to move the material through the impeller. An example of impeller structure is disclosed by Hansen in U.S. Pat. No. 3,589,500.

The rear portion of frame member 28 is spaced from the side wall with an arm 68 carrying a wheel 69. Wheel 69 is rotatably mounted about an upright axis on the outer end of the arm 68 and engages the inside surface of the silo wall 21. An elongated brace 71 is connected between the inner end of frame member 28 and the outer end of arm 68.

Out chute 34 is maintained in alignment with the door 22 with a torque arm 72. The torque arm 72 is an elongated rod having an outer end engaging against a portion of the silo wall forming the door 22. The inner end of the arm has a transverse finger or end 73 that is rotatably mounted in a sleeve 74. Sleeve 74 is secured to slip ring assembly 33.

A lift attachment indicated generally at 76 is attached to the collector 31 and impeller 32. A cable 77 connected to clamp 87 has a loop attached to lift attachment 76. Cable 77 extends upwardly from lift attachment 76 to a tripod, indicated generally at 78 in FIG. 5, mounted on top of silo wall 21. Tripod 78 has a plurality of legs 79, preferably three. Each leg has a foot 81 mounted on the top edge of silo wall 21. A first pulley 82 is rotatably mounted on the upper end of one leg. A second pulley 83 is rotatably mounted on the foot 81 of the same leg. Cable 77 is trained about pulleys 82 and 83 and extends downwardly adjacent the outside of the silo to a suitable winch structure. An example of a winch is disclosed by Buschbom in U.S. Pat. No. 3,235,229. Tripod 78 is positioned under the silo roof 84 in the roof space or area 86. Silo unloader 27 has been elevated into space 86 below roof 84.

Lift attachment 76 as shown in FIGS. 2 and 3, has an elongated linear body 88. Body 88 is a linear cylindrical member. Body 88 can be tubular. A pair of downwardly and outwardly directed legs 89 and 91 are secured to the outer end of body 88 with welds or the like. Leg 89 has a downwardly directed foot 92. Leg 91 has a downwardly directed foot 93. Leg 89 and foot 92 comprise a single flat strap or bar member. Leg 91 is of a similar bar construction. Leg 89 is longer than leg 91 and has a different angular incline to locate feet 92 and 93 in the same horizontaL plane. A first upwardly directed bracket or tab 94 is secured to the silo unloader frame member 28. The tab 94 is located adjacent the inside of foot 92. A plurality of fasteners 97, such as nut and bolt assemblies, secure the foot 92 to the tab 94. A second upright tab or bracket 96 is secured to the frame member 29 by welds or the like. The tab 96 is located adjacent the inside of foot 93. A plurality of fasteners 97, as nut and bolt assemblies, secure the foot 93 to the tab 96. Feet 92 and 93 have two pairs of holes 95 for accommodating the fasteners 97 in two positions. The flat feet 92 and 93 can be readily attached to channel beam frame members without the use of tabs 94 and 96.

Referring to FIGS. 3, 4, and 6, the inner end of body 88 has a pair of spaced flat members or ears 98 and 99 having transversely aligned holes 100. A transverse pin 101 connects the ears 98 and 99 to upwardly directed brackets or arms 102 and 103. The arms 102 and 103 are secured by welds or the like to opposite side walls 45 of the impeller housing 44. As shown in FIG. 2, arm 103 has a hole 104 for accommodating pin 101.

An adjustable member or sleeve 106 is slidably mounted on body 88. Sleeve 106 has a cylindrical inside wall located in close sliding relationship with the outside cylindrical wall of body 88. Sleeve 106 can be secured in a fixed relationship relative to body 88 with a pair of lock bolts 107 and 108. As shown in FIG. 4, lock bolt 108 is threaded into a nut 109 secured by welds or the like to the top of sleeve 106. A similar nut is used to accommodate the bolt 107. A single lock bolt can be used to hold sleeve 106 in a selected position on body 88.

A pair of upright members or flanges 110 and 111 are secured to opposite sides of sleeve 106. Members 110 and 111 are spaced from each other and are parallel to each other. The outer ends of the members 110 and 111 have transverse aligned holes 112 for accommodating a pin or bolt 113. Pin 113 extends through the eye of the loop of cable 77 thereby connecting cable 77 to the lift attachment 76.

In use, lift attachment 76 is secured to the collector 31 and housing 44 to locate the body 88 in generally horizontal position when collector 31 is in the horizontal position. Sleeve 106 is movable relative to body 88 to change the lifting or fulcrum point of silo unloader 27. When silo unloader 27 is elevated with the normal pendulant cable, it will move in a generally vertical position since collector 31 is considerably heavier than motor 53 and transmission 52 as counter-weights are not used with this type of silo unloader. Sleeve 106 can be positioned relative to body 88 to horizontally balance silo unloader 27 so that it can be lifted in a generally horizontal position.

When silo unloader 27 is to be elevated to the top of the silo, such as when the silo is being filled, sleeve 106 is moved to a position closer to impeller housing 44 whereby silo unloader 27 can be inclined at a selected angle. The angle of inclination of silo unloader 27 is selected in accordance with the space requirements under silo roof 84. Silo unloader 27 can be raised into close proximity with the roof 84, thereby providing greater room in the silo and less interference by silo unloader 27 with the material being filled in the silo.

While there has been shown and described a preferred embodiment of the lift attachment for a silo unloader, it is understood that changes in the size, shape, and construction of the lift attachment may be made by those skilled in the art without departing from the invention. Also, the lift attachment can be used to connect other objects to lift structures. The invention is defined in the following claims.

The embodiments of the invention in which an exclusive privilege or property are defined as follows:

1. A top unloading silo unloader for removing material from a tower silo comprising: a material collector having a pair of elongated generally horizontal frame members and means for moving material toward the central area of the silo, an impeller having a housing operable to receive material from the collector and move the material from the impeller to a selected location, means for moving the collector around the silo, a lift attachment adapted to be connected to a lifting cable, said lift attachment having a generally horizontal body having a first end and a second end, first means connecting the first end of the body to the housing, second means connecting the second end of the body to the frame members, and third means on the body adapted to be connected to the cable whereby the cable can lift the silo unloader in the silo, said third means including a member which can be moved along the length of the body, and lock means for fixing a selected location of the member on the body.

2. The unloader of claim 1 wherein: the body is an elongated linear cylindrical member.

3. The unloader of claim 3 wherein: the member of the third means is a sleeve telescoped around the cylindrical member and slidable thereon, and said lock means cooperates with the member of the third means for fixing the position of the sleeve on the cylindrical member.

4. The unloader of claim 3 wherein: the lock means has at least one bolt threadably mounted on the sleeve and engageable with the cylindrical member to lock the sleeve in a selected position on the cylindrical member.

5. The unloader of claim 3 including: a pair of upright members secured to the sleeve adapted to hold a pin connected to the lifting cable.

6. The unloader of claim 1 wherein: the first means connecting the first end of the body to the housing includes a pair of members attached to the first end of the body and extended outwardly therefrom, a pair of tabs secured to the impeller housing, and means pivotally connecting the pair of members to the tabs.

7. The unloader of claim 1 wherein: the second means connecting the second end of the body to the frame members includes a pair of legs attached to the frame members of the collector.

8. The unloader of claim 7 wherein: said pair of legs project generally normal to the longitudinal length of the body and diverge from each other away from the body in a downwardly and outwardly direction.

9. The unloader of claim 7 wherein: one of the legs is longer than the other leg.

10. A top unloading silo unloader for removing material from a tower silo comprising: a material collector having a pair of elongated generally horizontal frame members, and means for moving material toward the center area of the silo, and an impeller having a housing operable to receive material from the collector and move the material from the impeller to a selected location, means for moving the collector around the silo, a lift attachment adapted to be connected to a lifting cable, said lift attachment having a generally horizontal body having a first end and a second end, said body being an elongated linear cylindrical member, first means connecting the first end of the body to the housing, said first means including a pair of members attached to the first end of the body, said pair of members being connectable to one part of the housing, second means connecting the second end of the body to the frame members, said second means including a pair of legs projected generally normal to the longitudinal length of the body and diverging from each other away from the body, said legs being connectable to separate portions of the frame members, third means on the body adapted to be connected to the cable whereby the cable can lift the silo unloader in the silo, said third means including a sleeve telescoped around the body and slidable thereon, releasable lock means for fixing the position of the sleeve on the body, and a pair of members secured to the sleeve and adapted to be connected to the cable.

11. A lift attachment for a top unloading silo unloader having a collector for gathering material and means having a housing for moving material from the collector to a selected location, comprising: an elongated body having a first end and a second end, first means adapted to connect the first end of the body to the housing, second means adapted to connect the second end of the body to the collector, and third means on the body adapted to be connected to lifting structure, said third means including a member which can be moved along the length of the body, and lock means for fixing a selected location of the member on the body.

12. The attachment of claim 11 wherein: the body is an elongated linear cylindrical member.

13. The attachment of claim 12 wherein: said member of the third means on the body is a sleeve telescoped on the cylindrical member and slidable thereon, and said lock means being operable for fixing the position of the sleeve on the cylindrical member.

14. The attachment of claim 13 wherein: said lock means includes at least one bolt threadably mounted on the sleeve and engageable with the cylindrical member to lock the sleeve in a selected position on the cylindrical member.

15. The attachment of claim 13 including: a pair of members secured to the sleeve adapted to hold means connectable to the lifting structure.

16. The attachment of claim 11 wherein: the first means includes a pair of members attached to the first end of the body and extended outwardly therefrom, said members adapted to be connected to the housing.

17. The attachment of claim 11 wherein: the second means includes a pair of legs attached to the second end of the body, said legs being connectable to separate portions of the collector.

18. The attachment of claim 17 wherein: said pair of legs project generally normal to the longitudinal length of the body and diverge away from each other adjacent opposite portions of the collector.

19. A lift attachment for a top unloading silo unloader having a collector for gathering material and means having housing for moving material from the collector to a selected location, comprising: an elongated body having a first end and a second end, said body being an elongated linear cylindrical member, first means adapted to connect the first end of the body to the housing, said first means including a pair of members attached to the first end of the body, said pair of members being connectable to one part of the means for moving material from the collector, second means adapted to connect the second end of the body to the collector, said second means including a pair of legs projected generally normal to the longitudinal length of the body and diverging from each other away from the body, said legs being connectable to separate portions of the collector, third means on the body adapted to be connected to lifting structure, said third means including a sleeve telescoped around the body and slidable thereon, releasable lock means for fixing the position of the sleeve on the body, and a pair of members secured to the sleeve and adapted to be connected to lifting structure.

20. A top unloading silo unloader for removing material from a tower silo comprising: a material collector having a frame and means moving material toward the center area of the silo, and an impeller having a housing operable to receive material from the collector and move the material from the housing to a selected location, means for moving the collector around the silo, a lift attachment adapted to be connected to a single lifting cable, said cable operable to pendently support the silo unloader in the silo, said lift attachment having a body, said body having a first end and a second end, said body being located above said collector and extended generally parallel to the collector, first means attaching the first end of the body to the housing, second means attaching the second end of the body to the frame, and third means on the body between the first and second end thereof for accommodating the single cable whereby the cable pendently supports the silo unloader between the first and second ends of the body.

21. The unloader of claim 20 wherein: the third means on the body is a member which can be moved along the length of the body, and means for fixing a selected location of the member on the body.

22. The unloader of claim 21 wherein: the body is an elongated linear cylindrical member.

23. The unloader of claim 22 wherein: the member of the third means is a sleeve telescoped around the cylindrical member and slidable thereon, said means for fixing a selected location of the member on the body cooperates with the member on the third means for locking the sleeve on the cylindrical member.

24. The unloader of claim 23 including: a pair of upright members secured to the sleeve adapted to hold a pin connected to the single lifting cable.

25. The unloader of claim 20 wherein: the first means connecting the first end of the body to the housing includes a pair of members attached to the first end of the body and extended outwardly therefrom, a pair of tabs secured to the impeller housing, and means pivotally connecting the pair of members to the tabs.

26. The unloader of claim 20 wherein: the second means connecting the second end of the body to the frame includes a pair of legs attached to the frame.

27. The unloader of claim 26 wherein: said pair of legs project generally normal to the longitudinal length of the body and diverge from each other away from the body in a downwardly and outwardly direction.

28. The unloader of claim 27 wherein: one of the legs is longer than the other leg.

29. The unloader of claim 20 wherein: the body is an elongated linear cylindrical member, said first means includes a pair of members attached to the first end of the body, said pair of members being connectable to one part of the housing, said second means including a pair of legs projected generally normal to the longitudinal length of the body and diverging from each other away from the body, said legs being connectable to separate portions of the frame, said third means including a sleeve telescoped around the body and slidable thereon, a releasable lock means for fixing the position of the sleeve on the body, and a pair of members secured to the sleeve and adapted to be connected to the cable.

* * * * *

UNITED STATES PATENT AND TRADEMARK OFFICE
CERTIFICATE OF CORRECTION

PATENT NO. : 4,132,450
DATED : January 2, 1979
INVENTOR(S) : Glen D. Hansen

It is certified that error appears in the above-identified patent and that said Letters Patent are hereby corrected as shown below:

Column 6, line 6 (Claim 3), cancel "The unloader of Claim 3" and insert -- The unloader of Claim 2 --.

Signed and Sealed this

Third Day of July 1979

[SEAL]

Attest:

Attesting Officer

LUTRELLE F. PARKER
Acting Commissioner of Patents and Trademarks